United States Patent [19]
Aoki et al.

[11] Patent Number: 4,975,866
[45] Date of Patent: Dec. 4, 1990

[54] INTERPOLATION SYSTEM

[75] Inventors: Akio Aoki, Tokyo; Kenichi Nagasawa, Kawasaki, both of Japan

[73] Assignee: Canon Kabushiki Kaisha, Tokyo, Japan

[21] Appl. No.: 260,571

[22] Filed: Oct. 21, 1988

[30] Foreign Application Priority Data

Oct. 27, 1987 [JP] Japan ................... 62-272285

[51] Int. Cl.$^5$ .............................. G06F 7/38
[52] U.S. Cl. .................................. 364/723
[58] Field of Search ............. 364/723, 724.1, 724.13; 371/31

[56] References Cited

U.S. PATENT DOCUMENTS

| | | | |
|---|---|---|---|
| 3,996,456 | 12/1976 | Hoover | 364/723 X |
| 4,327,440 | 4/1982 | Furuya et al. | 364/423 X |
| 4,402,012 | 8/1983 | Knight | 364/723 X |
| 4,639,920 | 1/1987 | Kaneko | 364/723 X |
| 4,763,293 | 8/1988 | Takei et al. | 364/723 |
| 4,803,684 | 2/1989 | Kozuki et al. | 371/31 |
| 4,837,722 | 6/1989 | Sara | 364/723 |

Primary Examiner—Gary V. Harkcom
Assistant Examiner—Tan V. Mai
Attorney, Agent, or Firm—Fitzpatrick, Cella, Harper & Scinto

[57] ABSTRACT

An interpolation device arranged to input (a) a serial data sequence including a number of sampling data and (b) a serial flag sequence including flag data indicative of the validities of the number of sampling data, and arranged to output an output data sequence by replacing a part of the number of sampling data with interpolation data, includes a first juxtaposing circuit for receiving the input data sequence and the output data sequence and for outputting in parallel objective sampling data to be interpolated and a plurality of sampling data having a high correlation with the objective sampling data. An interpolation circuit is provided for outputting the output data sequence by selectively using the objective sampling data and the plurality of sampling data which are output from the first juxtaposing circuit. A second juxtaposing circuit is provided for receiving the flag sequence and for outputting in parallel a plurality of flag data indicative of validities of a part of the plurality of sampling data. A control circuit is provided for receiving the plurality of flag data which are output from the second juxtaposing circuit and for outputting control data to control the interpolation circuit. Finally, a switching circuit is provided for switching an output characteristic of the control circuit.

24 Claims, 1 Drawing Sheet

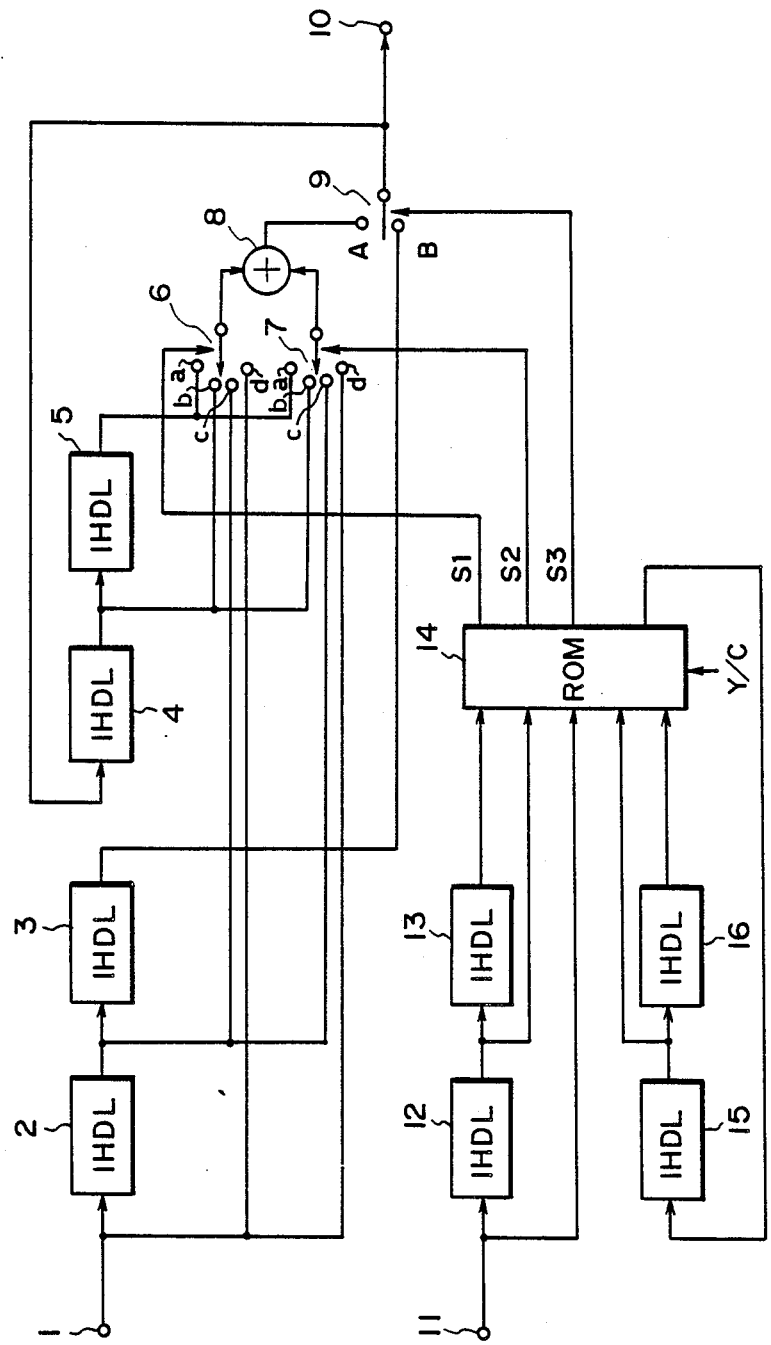
F I G. I

INTERPOLATION SYSTEM

BACKGROUND OF THE INVENTION

1. Field of the Invention

The present invention relates to an interpolation system and, more particularly, to an interpolation system to adaptively perform the interpolation.

2. Related Background Art

In general, an image signal has a large amount of information per unit time and when the image signal is transmitted as a digital signal, a transmission bit rate is extremely high. Therefore, to reduce the transmission bit rate, various kinds of band compression techniques have been proposed. As one of the band compression techniques, there is known a method of reducing the data amount by predictive differential encoding such as DPCM or the like. For instance, a simple predicting method such as an in-field previous value prediction DPCM or the like is an effective method since a relatively large data compression rate is obtained in spite of the fact that it can be easily realized by hardware.

On the other hand, it is also known that code errors occur due to various causes in the case of transmitting the foregoing data through a transmission path. Particularly, in the case where a magnetic recording and reproducing system is the transmission path, large code errors which cannot be error corrected can easily be caused in association with the generation of the signal dropout due to a scratch on a recording medium, choking of the head, or the like. If the error correction cannot be performed, data is generally interpolated by using the correlation of the image. Various kinds of methods have also been proposed with respect to the data interpolation.

With respect to the data interpolation, there is considered a method whereby the optimum interpolation data is calculated by performing the high degree arithmetic operations by using a few pixels before and after the pixel to be interpolated. However, this method is hardly effective in the case where the pixels to be interpolated continuously appear.

On the other hand, in the case of performing predictive encoding and transmitting the data, if one piece of data enters the error uncorrectable state, there will occur what is called error propagation such that errors are caused in all of the data which are decoded on the basis of the error uncorrectable data. Therefore, in many cases, the pixels to be interpolated continue in the horizontal direction of the image.

In the case of unreliable data where the data of the pixels arranged in the horizontal direction continue for the pixels to be interpolated, the interpolation data is formed by using the correlation in the vertical direction of the image. With respect to the interpolation using the correlation in the vertical direction of the image, the substitution by the pixel of the previous line, linear interpolation by the pixels of the lines before and after the line to be interpolated, and the like are considered. However, if the data to be interpolated continuously occur on a plurality of lines, the data cannot be interpolated even by those methods because the substitution or linear interpolation is not possible.

SUMMARY OF THE INVENTION

It is an object of the present invention to solve the foregoing problems under such circumstances.

Another object of the invention is to provide an interpolation system which can preferably easily perform the interpolation even if errors occur in some of a plurality of samples having a high correlation for an objective sample to be interpolated.

Under such objects, according to the invention, as one embodiment thereof, there is provided an interpolation system comprising: (a) first parallel outputting means for simultaneously outputting a plurality of sampling data regarding a plurality of samples having a high correlation for an objective sample to be interpolated; (b) selecting means for selectively outputting the two or more sampling data among the plurality of sampling data which are output from the first juxtaposing means; (c) arithmetic operating means for receiving the two or more sampling data which are output from the selecting means and for outputting arithmetically operated data; (d) second juxtaposing means for simultaneously outputting a plurality of flag data indicative of the validities of the plurality of sampling data; and (e) control means for receiving the plurality of flag data which are output from the second juxtaposing means and for outputting control data to control the selecting means.

Still another object of the invention is to provide an interpolation system in which a circuit arrangement is simple and a processing speed is high.

Under this object, according to the invention, as one embodiment, there is provided an interpolation system comprising: (a) first juxtaposing means for simultaneously outputting a plurality of sampling data regarding a plurality of samples having a high correlation for an objective sample to be interpolated; (b) arithmetic operating means for outputting arithmetically operated data by using the two or more sampling data among the plurality of sampling data which are output from the first juxtaposing means; (c) second juxtaposing means for simultaneously outputting a plurality of flag data indicative of validities of the plurality of sampling data; and (d) a look-up table for receiving the plurality of flag data which are output from the second juxtaposing means and for outputting control data to control the arithmetic operating means.

The above and other objects and features of the present invention will become apparent from the following detailed description and the appended claims with reference to the accompanying drawings.

BRIEF DESCRIPTION OF THE DRAWING

FIG. 1 is a diagram showing an arrangement of an interpolating circuit as an embodiment of the present invention.

DESCRIPTION OF THE PREFERRED EMBODIMENT

An embodiment of the present invention will be described hereinbelow.

FIG. 1 is a diagram showing an arrangement of an interpolating circuit as an embodiment of the invention. In the diagram, reference numeral 1 denotes a terminal to which image data (before an interpolating process) is supplied and 11 is a terminal to which an error flag of one bit indicating whether the image data input to the terminal 1 is erroneous or not is input. Reference numerals 2, 3, 4, 5, 12, 13, 15, and 16 denote 1H delay lines (1HDLs) each for delaying the input data by one horizontal scan period (1H).

In this example, the data of the pixels in which no code error occurs are directly output through the 1HDLs 2 and 3 and a B side terminal of a switch 9. That is, when the error flags which are input to an ROM (read only memory) 14 through the 1HDLs 12 and 13 are set to "0" (indicating that no code error occurs), the switch 9 is connected to the B side by a control signal S3 which is output from the ROM 14. On the other hand, when the error flag output from the 1HDL 13 is set to "1", the control signal S3 allows the switch 9 to be connected to the A side, so that the interpolation data is output to a terminal 10. Both of the data selected by a switch 6 and the data selected by a switch 7 are supplied to a mean value calculating circuit 8 and the resultant data of the mean value is used as the interpolation data. This interpolation data is input to the 1HDL 4.

Therefore, for the data of the pixel (hereinafter, referred to as an objective pixel) which is output from the 1HDL 3, the input data to the 1HDLs 2 and 3 are the data of the pixels which are located on the lines which are lower than the line of the objective pixel by two lines and one line. The output data from the 1HDLs 4 and 5 are the data of the pixels which are located on the lines which are higher than the line of the objective pixel by one line and two lines. The switches 6 and 7 selectively alternatively output those four data in accordance with control signals S1 and S2 which are output from the ROM 14.

On the other hand, error flags regarding the pixels which are located on the lines which are lower than the line of the objective pixel by two lines and one line are input to the 1HDLs 12 and 13. The output data of the 1HDLs 15 and 16 are the data of two bits representative of the output states of the pixels locating on the lines which are higher than the line of the objective pixel by one line and two lines. The 2-bit data are generated from the ROM 14 and can be used to distinguish, for instance, the case where good data is obtained by the interpolation when the error flag is set to "1" and the case where the interpolation cannot be performed.

The ROM 14 receives the input data of five systems and seven bits and Y/C discrimination data, which will be explained hereinlater, and outputs the control signals S1, S2, and S3 which are predetermined on the basis of a predetermined logic. Each of the control signals S1 and S2 is the data of two bits. The control signal S3 is the data of one bit. Together with these data, the ROM 14 outputs the 2-bit data indicative of the output state of the objective pixel.

In the embodiment, the image data which is input to the terminal 1 assumes the data which is derived by time-sharingly multiplexing on a 1H unit basis the data of the luminance signal and the data of the line sequential color difference signal. In the case of interpolating the line sequential color difference signal, since the kinds of pixels which are neighboring in the vertical direction differ, there is no correlation and they cannot be used for the arithmetic operation of the interpolation data. Therefore, since the arithmetic operating equation of the interpolation data needs to be changed by the luminance signal and line sequential color difference signal, the one-bit data for the Y/C discrimination indicating whether the data to be output is the luminance signal or the line sequential color difference signal is input to the ROM 14.

An example of the practical operation of the foregoing circuit will now be described.

When the error flag of the objective pixel is set to "1" and the error flags of the two pixels which are adjacent in the vertical direction are set to "0", the linear interpolation can be performed by using the upper and lower pixels of the objective pixel. Therefore, the data of the control signals S1 and S2 are decided so as to connect the switch 6 to the b terminal and the switch 7 to the c terminal, while the switch 9 is connected to the A side. On the other hand, the 2-bit data indicative of the fact that although the error flag is set to "1", the interpolation data was obtained is supplied to the 1HDL 15.

When all of the error flags of the objective pixel and the pixels locating on the lines lower than the line of the objective pixel by one line and two lines are set to "1" and the error flag of the pixel locating on the line higher than the line of the objective pixel by one line is set to "0", the control signals S1 and S2 are preferably determined so as to connect both of the switches 6 and 7 to the b terminals and to use the data themselves of the adjacent pixels over the objective pixel as the interpolation data.

In this manner, if the relation between the input and output data of the ROM 14 is decided by checking the generation pattern of the error flags regarding the pixels arranged in the vertical direction of the image and by setting a desired image, the ideal interpolation between lines can be executed in accordance with a desired design condition.

According to the construction of the embodiment mentioned above, the interpolation between lines can be adaptively performed and the good interpolation data can be also formed even by only the interpolation between lines. In addition, even in the case where what is called a TCI (Time Compressed Integration) signal which is obtained by time base multiplexing the luminance signal and line sequential color difference signal as the input signals on a 1H unit basis is input, the interpolation data can be adaptively formed even for any of these signals. Therefore, there is no need to provide different interpolating circuits for the luminance signal and line sequential color difference signal and the same interpolating circuit can be commonly used. Further, either one of the mean value interpolation and the previous value interpolation can be selected by the control of the switches 6 and 7. The circuit arrangement of the mean value calculating circuit 8 and subsequent circuits can be fairly simplified.

In the embodiment, the pixels of five lines before and after the objective pixel including the objective pixel have been used to form the interpolation data. However, the number of lines can be arbitrarily determined as necessary.

On the other hand, although the foregoing embodiment has shown the optimum arrangement, even if a portion of the ROM 14 is constructed by a logic circuit, the circuit arrangement of the control section is complicated as compared with that in the rest of embodiment. However, there is no need to provide a plurality of calculating circuits and the construction of the calculating section is simple. Further, the invention can be applied to not only the interpolation between lines but also a general interpolating circuit. The data to be interpolated are not limited to the image data.

As explained above, according to the interpolation system of the invention, adaptive interpolation can be realized by an extremely simple circuit construction.

What is claimed is:

1. An interpolation device arranged to input (a) a serial input data sequence including a number of sampling data and (b) a serial flag sequence including flag data indicative of the validities of said number of sampling data, and arranged to output an output data sequence by replacing a part of the number of sampling data with interpolation data, comprising:

(a) first juxtaposing means for receiving said input data sequence and said output data sequence and for outputting in parallel objective sampling data to be interpolated and a plurality of sampling data having a high correlation with the objective sampling data;

(b) selecting means for selectively outputting two or more sampling data from among said plurality of sampling data which are output from said first juxtaposing means;

(c) arithmetic operating means for receiving said two or more sampling data which are output from said selecting means and for outputting said interpolation data;

(d) second juxtaposing means for receiving said flag sequence and for outputting in parallel a plurality of flag data indicative of the validities of a part of said plurality of sampling data;

(e) control means for receiving said plurality of flag data which are output from said second juxtaposing means and for outputting control data to control the sampling means; and (f) replacing means for replacing said objective sampling data with said interpolation data in response to flag data indicative of a validity of said objective sampling data.

2. An interpolation device according to claim 1, wherein said control means outputs validity data indicating whether or not interpolation data for said objective sampling data is valid.

3. An interpolation device according to claim 2, further comprising third juxtaposing means for inputting in parallel said validity data regarding a part of said plurality of sampling data to said control means.

4. An interpolation device according to claim 1, wherein said selecting means includes two selecting circuits each for selectively outputting one of said plurality of sampling data.

5. An interpolation device according to claim 4, wherein said arithmetic operating means includes a mean value calculating circuit to calculate data of a mean value of the two sampling data which are output from said two selecting circuits.

6. An interpolation device according to claim 1, wherein said control means includes look-up table means for receiving said plurality of flag data which are output from said second juxtaposing means as address data and for outputting the control data memorized therein.

7. An interpolation device according to claim 6, wherein said look-up table means includes a read only memory.

8. An interpolation device according to claim 1, further comprising switching means for switching an output characteristic of said control means.

9. An interpolation device according to claim 8, wherein said number of sampling data includes sampling data of a luminance signal and sampling data of a color signal, and wherein said switching means switches the output characteristic of said control means in dependence on whether the objective sampling data is the sampling data of the luminance signal or the sampling data of the color signal.

10. An interpolation device according to claim 9, wherein said input data sequence time-sharpingly includes the sampling data of the luminance signal and sampling data of a line sequential color difference signal.

11. An interpolation device according to claim 1, wherein said input data sequence comprises sampling data of a video signal and a plurality of sampling data close to a pixel corresponding to said objective sampling data on a screen.

12. An interpolation device according to claim 11, wherein said plurality of pixels are arranged in the vertical direction on the screen.

13. An interpolation device arranged to input (a) a serial input data sequence including a number of sampling data and (b) a serial flag sequence including flag data indicative of the validities of said number of sampling data, and arranged to output an output data sequence by replacing a part of the number of sampling data with interpolation data, comprising:

(a) first juxtaposing means for receiving said input data sequence and said output data sequence and for outputting in parallel objective sampling data to be interpolated and a plurality of sampling data having a high correlation with the objective sampling data;

(b) interpolation means for outputting said output data sequence by selectively using said objective sampling data and said plurality of sampling data which are output from said first juxtaposing means;

(c) second juxtaposing means for receiving said flag sequence and for outputting in parallel a plurality of flag data indicative of validities of a part of said plurality of sampling data; and (d) a look-up table means for receiving said plurality of flag data which are output from said second juxtaposing means as address data, an for outputting control data memorized therein to control said interpolation means.

14. An interpolation device according to claim 13, wherein said look-up table means includes a read only memory.

15. An interpolation device according to claim 13, further comprising switching means for inputting switching data to switch the output characteristic to said look-up table means.

16. An interpolation device according to claim 15, wherein said number of sampling data includes sampling data of a luminance signal and sampling data of a color signal, and wherein said switching means switches said switching data which is input to said look-up table means in dependence on whether the objective sampling data is the sampling data of the luminance signal or sampling data of the color signal.

17. An interpolation device according to claim 16, wherein said input data sequence time-sharingly includes sampling data of the luminance signal and sampling data of a line sequential color difference signal.

18. An interpolation device according to claim 17, wherein said plurality of sampling data correspond to pixels arranged in the vertical direction on a screen.

19. An interpolation device according to claim 13, wherein said look-up table means further outputs validity data indicating whether or not interpolation data for said objective sampling data are valid.

20. An interpolation device according to claim 11, further comprising third juxtaposing means for simultaneously inputting said validity data corresponding to a part of said plurality of sampling data to said look-up table means as other address data.

21. An interpolation device arranged to input (a) a serial input data sequence including a number of sampling data and (b) a serial flag sequence including flag data indicative of the validities of said number of sampling data, and arranged to output an output data sequence by replacing a part of the number of sampling data with interpolation data, comprising:
 (a) first juxtaposing means for receiving said input data sequence and said output data sequence and for outputting in parallel of sampling data to be interpolated and a plurality of sampling data having a high correlation with the objective sampling data;
 (b) interpolation means for outputting said output data sequence by selectively using said objective sampling data and said plurality of sampling data which are output from said first juxtaposing means;
 (c) second juxtaposing means for receiving said flag sequence and for outputting in parallel a plurality of flag data indicative of validities of a part of said plurality of sampling data;
 (d) control means for receiving said plurality of flag data which are output from said second juxtaposing means and for outputting control data to control said interpolation means; and
 (e) switching means for switching an output characteristic of said control means.

22. An interpolation device according to claim 21, wherein said number of sampling data includes sampling data of a luminance signal and sampling data of a color signal, and wherein said switching means switches the output characteristic of said control means in dependence on whether the objective sampling data is the sampling data of the luminance signal or the sampling data of the color signal.

23. An interpolation device according to claim 22, wherein said input data sequence time-sharingly includes the sampling data of the luminance signal and sampling data of a line sequential color difference signal.

24. An interpolation device according to claim 23, wherein said plurality of sampling data correspond to pixels arranged in the vertical direction on a screen.

* * * * *

UNITED STATES PATENT AND TRADEMARK OFFICE
CERTIFICATE OF CORRECTION

PATENT NO. : 4,975,866

DATED : December 4, 1990

INVENTOR(S) : AKIO AOKI, ET AL.

It is certified that error appears in the above-identified patent and that said Letters Patent is hereby corrected as shown below:

COLUMN 2

Line 45, "and the appended claims" should be deleted.
Line 61, "supplied" should read --supplied,--.

COLUMN 4

Line 55, "of embodiment." should read --of the embodiment.--.
Line 66, "a" should read --an--.
Line 67, "serial" should be deleted and "including" should read --serially including--.
Line 68, "serial" should be deleted and "including" should read --serially including--.

COLUMN 5

Line 26, "sampling means;" should read --selecting means;--.
Line 56, "read only" should read --read-only--.

COLUMN 6

Line 2, "time-sharpingly" should read --time-sharingly--.
Line 14, "a" should read --an--.
Line 15, "serial" should be deleted and "including" should read --serially including--.
Line 16, "serial" should be deleted and "including" should read --serially including--.
LIne 37, "an" should read --and--.
Line 41, "read only" should read --read-only--.
Line 66, "claim 11," should read --claim 19,--.

UNITED STATES PATENT AND TRADEMARK OFFICE
CERTIFICATE OF CORRECTION

PATENT NO. : 4,975,866

DATED : December 4, 1990

INVENTOR(S) : AKIO AOKI, ET AL.

It is certified that error appears in the above-identified patent and that said Letters Patent is hereby corrected as shown below:

COLUMN 7

Line 3, "a" should read --an--.
    Line 4, "serial" should be deleted and "including" should read --serially including--.
    Line 5, "serial" should be deleted and "including" should read --serially including--.
    Line 12, "of sampling data" should read --objective sampling data--.

Signed and Sealed this

Eleventh Day of August, 1992

Attest:

DOUGLAS B. COMER

*Attesting Officer*    Acting Commissioner of Patents and Trademarks